United States Patent
Lindberg et al.

(10) Patent No.: US 10,343,563 B2
(45) Date of Patent: Jul. 9, 2019

(54) END PART AND A CROSS MEMBER FOR A VEHICLE SEAT

(71) Applicant: Volvo Car Corporation, Gothenburg (SE)

(72) Inventors: Jorgen Lindberg, Uddevalla (SE); Tobias Eriksson, Gothenburg (SE); Veronica Amvall, Molnlycke (SE); Adam Skagius, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 15/783,511

(22) Filed: Oct. 13, 2017

(65) Prior Publication Data
US 2018/0111517 A1 Apr. 26, 2018

(30) Foreign Application Priority Data
Oct. 26, 2016 (EP) .................................... 16195802

(51) Int. Cl.
*B60N 2/42* (2006.01)
*B60N 2/427* (2006.01)
*B60N 2/68* (2006.01)
*B60N 2/16* (2006.01)

(52) U.S. Cl.
CPC ............... *B60N 2/42* (2013.01); *B60N 2/161* (2013.01); *B60N 2/4235* (2013.01); *B60N 2/42709* (2013.01); *B60N 2/68* (2013.01)

(58) Field of Classification Search
CPC ........... B60N 2/20; B60N 2/68; B60N 2/4235
USPC .................... 297/452.18, 452.2, 216.13
See application file for complete search history.

(56) References Cited

U.S. PATENT DOCUMENTS

| | | | | |
|---|---|---|---|---|
| 5,253,924 A | * | 10/1993 | Glance .................. | B60N 2/688 297/216.13 |
| 5,310,247 A | * | 5/1994 | Fujimori ................ | B60N 2/071 297/452.18 X |
| 5,328,248 A | * | 7/1994 | Nishiyama ............. | B60N 2/071 297/452.18 |
| 5,547,259 A | * | 8/1996 | Fredrick ................ | B60N 2/682 297/452.18 X |
| 5,722,731 A | * | 3/1998 | Chang .................. | B60N 2/0705 297/452.2 X |

(Continued)

FOREIGN PATENT DOCUMENTS

| | | |
|---|---|---|
| EP | 0788924 A2 | 8/1997 |
| JP | 2009006895 | 1/2009 |

*Primary Examiner* — Rodney B White
(74) *Attorney, Agent, or Firm* — Snyder, Clark, Lesch & Chung, LLP

(57) ABSTRACT

Embodiments described herein relate to an end part for a cross member for a vehicle seat, a cross member for a vehicle seat comprising at least one end part, and a vehicle seat comprising at least one such cross member. The end part has a first portion with an impact receiving surface adapted to receive an impact during a side collision. The cross member has a longitudinal center line. A center point of the impact receiving surface is offset with respect to the longitudinal center line so as to bend the cross member in a predetermined direction during the side collision. The present invention provides for a simple way to modify a cross member, or to provide a cross member with additional functionality and increased safety properties.

14 Claims, 7 Drawing Sheets

(56) References Cited

U.S. PATENT DOCUMENTS

| | | | | |
|---|---|---|---|---|
| 5,918,943 A * | 7/1999 | Mitschelen | B60N 2/68 | |
| | | | 297/452.18 X | |
| 6,082,818 A * | 7/2000 | Muller | B60N 2/28 | |
| | | | 297/452.2 X | |
| 6,299,239 B1 | 10/2001 | Sagawa et al. | | |
| 6,817,672 B2 * | 11/2004 | Matsunuma | B60N 2/682 | |
| | | | 297/452.18 | |
| 6,991,287 B1 * | 1/2006 | Ogawa | B60N 2/888 | |
| | | | 297/216.13 X | |
| 7,284,800 B2 * | 10/2007 | Ishizuka | B60N 2/753 | |
| | | | 297/452.18 | |
| 7,540,563 B2 * | 6/2009 | Ogawa | B60N 2/4228 | |
| | | | 297/216.13 | |
| 8,366,146 B2 * | 2/2013 | Yamaki | B60N 2/4235 | |
| | | | 297/216.13 X | |
| 8,459,747 B2 * | 6/2013 | Watanabe | B60N 2/22 | |
| | | | 297/452.18 | |
| 8,480,174 B2 * | 7/2013 | Konagai | B60N 2/4235 | |
| | | | 297/216.13 X | |
| 8,506,011 B2 * | 8/2013 | Niitsuma | B60N 2/682 | |
| | | | 297/452.18 X | |
| 8,628,144 B2 * | 1/2014 | Moegling | B60R 22/22 | |
| | | | 297/452.18 X | |
| 8,696,060 B2 * | 4/2014 | Mizobata | B60N 2/888 | |
| | | | 297/216.13 X | |
| 8,827,362 B2 * | 9/2014 | Yamaki | B60N 2/4235 | |
| | | | 297/216.13 | |
| 8,833,849 B2 * | 9/2014 | Ishimoto | B60N 2/68 | |
| | | | 297/216.1 | |
| 8,840,178 B2 * | 9/2014 | Mitsuoka | B60N 2/20 | |
| | | | 297/216.13 | |
| 8,888,178 B2 * | 11/2014 | Tanabe | B60N 2/36 | |
| | | | 297/216.13 | |
| 9,010,855 B2 * | 4/2015 | Yamaki | B60N 2/0232 | |
| | | | 297/216.13 | |
| 9,039,093 B2 * | 5/2015 | Nishiura | B60N 2/68 | |
| | | | 297/216.13 | |
| 2005/0168041 A1 * | 8/2005 | Glance | B60N 2/68 | |
| | | | 297/452.18 | |
| 2006/0055225 A1 * | 3/2006 | Yasuda | B60N 2/58 | |
| | | | 297/452.18 | |
| 2010/0007122 A1 * | 1/2010 | Clauser | B60N 2/68 | |
| | | | 280/730.2 | |
| 2012/0112512 A1 * | 5/2012 | Sakai | B60N 2/7017 | |
| | | | 297/452.18 | |
| 2012/0217775 A1 * | 8/2012 | Fujita | B60N 2/4221 | |
| | | | 297/216.13 | |
| 2012/0306253 A1 * | 12/2012 | Seibold | B60N 2/68 | |
| | | | 297/452.18 X | |
| 2013/0069415 A1 * | 3/2013 | Yasuda | B60N 2/682 | |
| | | | 297/452.18 | |
| 2013/0187418 A1 * | 7/2013 | Watanabe | B60N 2/4221 | |
| | | | 297/216.14 | |
| 2013/0187430 A1 * | 7/2013 | Watanabe | B60N 2/68 | |
| | | | 297/452.19 | |
| 2013/0341991 A1 * | 12/2013 | Matsuzaki | B60N 2/68 | |
| | | | 297/452.18 | |
| 2014/0139004 A1 * | 5/2014 | Matsumoto | B60N 2/68 | |
| | | | 297/452.18 | |
| 2014/0159462 A1 * | 6/2014 | Matsumoto | B60N 2/68 | |
| | | | 297/452.18 | |
| 2015/0239370 A1 | 8/2015 | Hoshi et al. | | |
| 2015/0321589 A1 * | 11/2015 | Takei | B60N 2/6009 | |
| | | | 297/452.18 | |
| 2016/0221485 A1 * | 8/2016 | Harris | B32B 27/38 | |
| 2016/0250950 A1 * | 9/2016 | Omori | B60N 2/427 | |
| | | | 29/897.2 | |

* cited by examiner

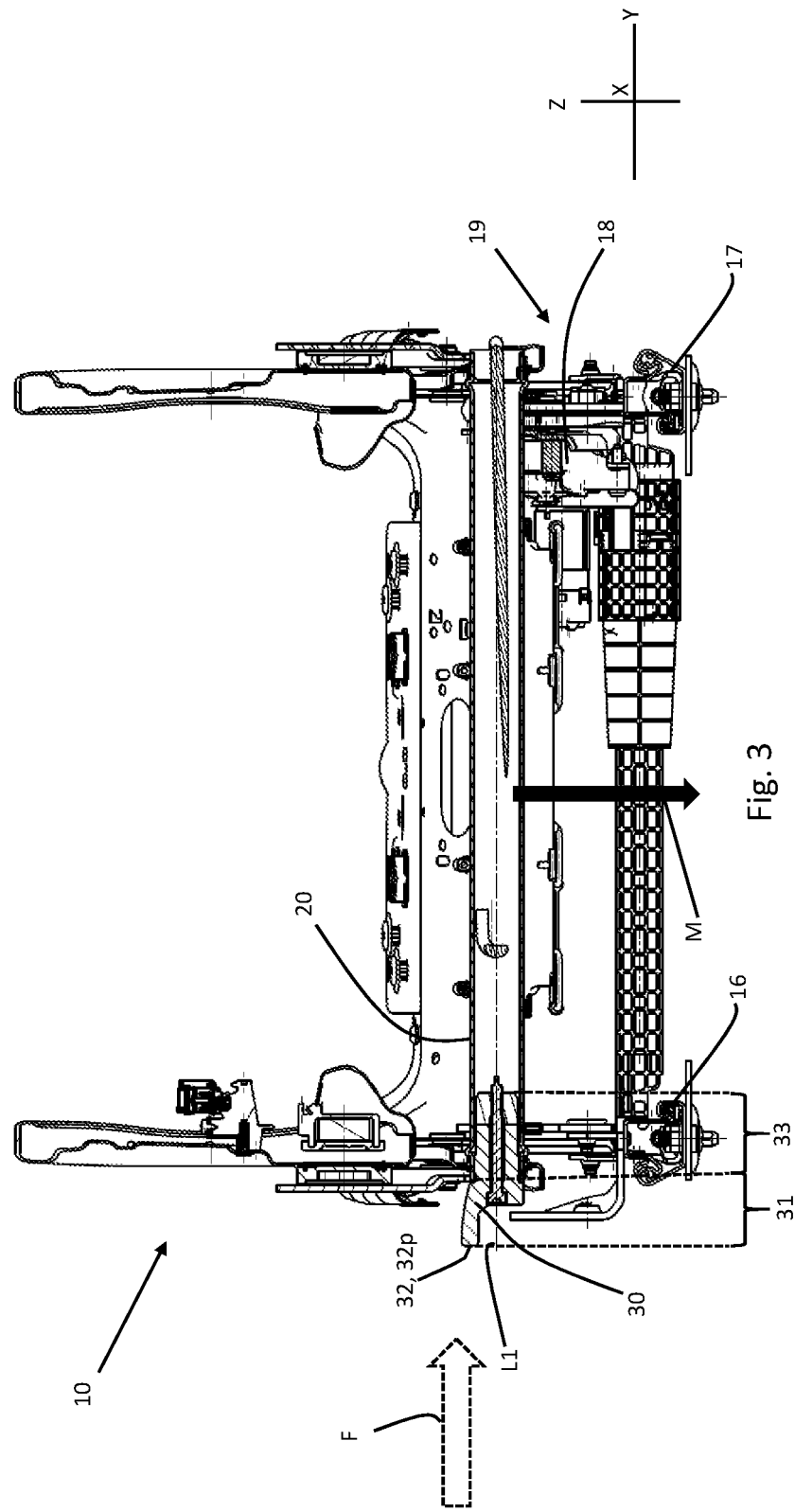

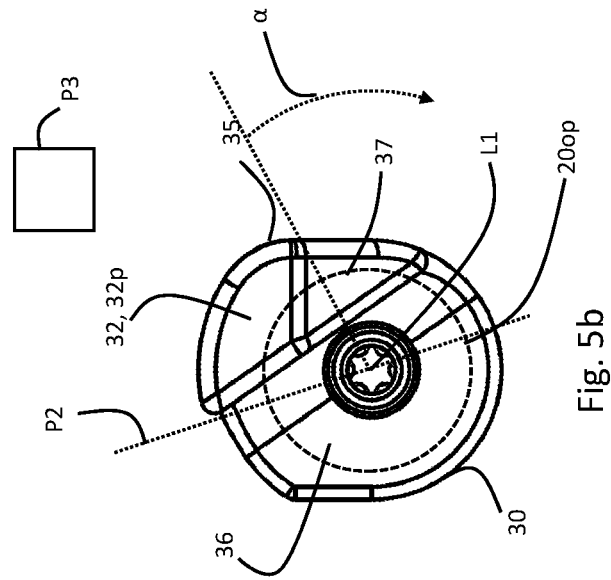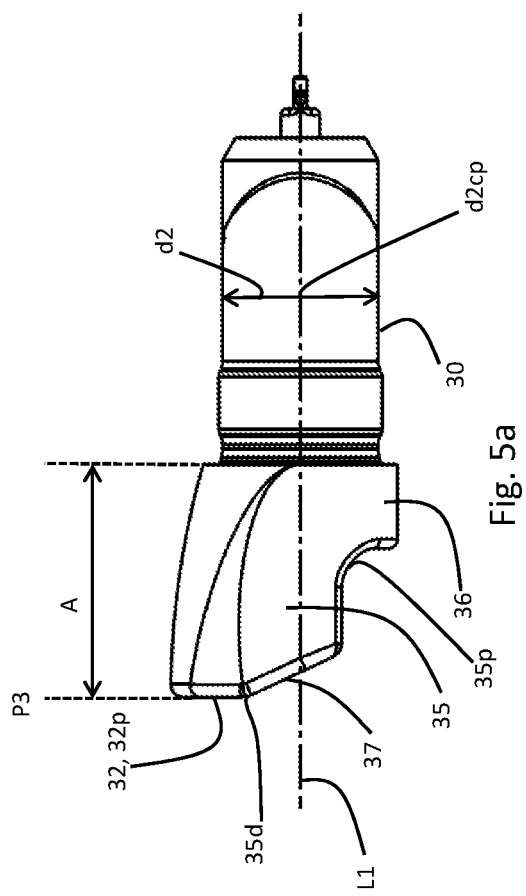

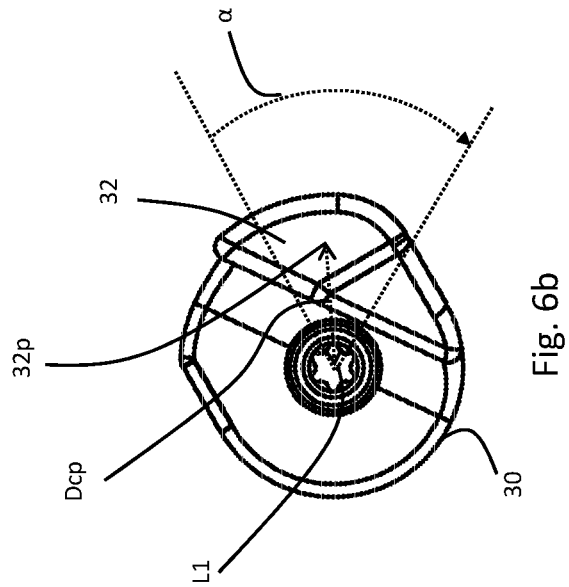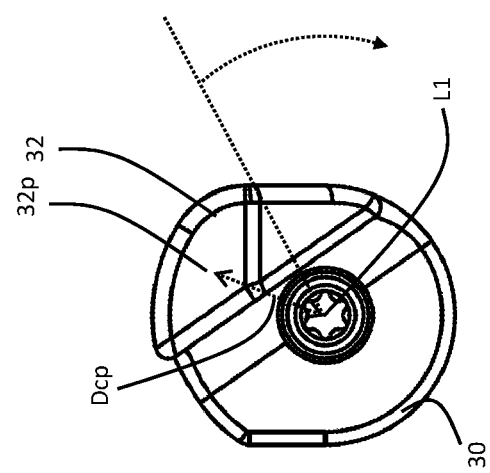

END PART AND A CROSS MEMBER FOR A VEHICLE SEAT

TECHNICAL FIELD

The present disclosure relates to an end part for a cross member, a cross member comprising at least one end part and a vehicle seat comprising at least one cross member. The end part of the cross member provides an improved passenger safety in cases of side collisions.

BACKGROUND

Vehicle manufacturers have continuously faced the challenges of vehicle collisions and the crash violence that such vehicle collisions may impart on the vehicle. Side impact protection system SIPS was one way of significantly improving the safety for passengers in vehicles. By introducing chassi beams underneath the vehicle seats and the dash board, the risk of side collisions could be significantly reduced. Air bags deployed at selected strategic positions gave additional protection to the passengers.

There are still needs however to continuously increase passenger safety. One way to provide additional safety to passengers is to provide improved vehicle seats. Generally, vehicle seats today have relatively stiff cross tubes, also referred to as cross brace or cross members. However cross members may deform unpredictably which could accidentally injure passengers or structural features of the vehicle or vehicle systems.

One attempt to provide a predictable deformation is disclosed in the published U.S. Pat. No. 6,523,893 B2 in which a vehicle seat having a cross brace intended to deform and bend in a predetermined way. The deformation is performed in two steps. Firstly; the cross brace is telescopically retracted as a function of the impact force and secondly; the cross brace bends in a predetermined way by use of notches. The solution is said to minimize danger of injury to the vehicle passengers. The disclosed solution is however not very attractive as it is a two-step procedure. Furthermore, the proposed solution requires the cross-brace to be manipulated by addition of corrugations which is costly and relatively difficult as tolerances of multiple components may need to fit with each other.

Another but different attempt at deal with side collisions is disclosed in the U.S. Pat. No. 8,182,026 B2 in which a cross member is made less strong but with the addition of an adjusting element arranged in the force path. The force adjustment element is intended to dissipate a considerable part of the force exerted in the event of a motor vehicle crashing by energy absorption via elastic, plastic and/or collapsing deformation. By means of a spring, the forces exerted may be absorbed. The just mentioned solution is directed to absorb the force exerted which in practice is very difficult. The force adjustment element may be partly formed by a spring, and a spring may be too stiff or too soft dependent on the exerted force.

Vehicle seats having relatively stiff cross tubes may rely on the fact that the vehicle seat may be displaced a limited distance so as to absorb some of the force exerted on the vehicle seat during a collision. However, due to the more frequent use of electric vehicles, the space between vehicle seats has become more limited or better used. The space between vehicle seats is sometimes referred to the tunnel area. In recent years, the space defined as the tunnel area has been consumed by battery storage in some vehicles. Hence earlier rigid cross members relying on the displacement of the vehicle seat may not be a sufficiently good solution any more. Further, batteries are very sensitive for intrusion of foreign objects as battery elements may be harmed during a collision. When using Lithium-ion batteries, intrusion of foreign objects may short circuit the batteries overheating the batteries with consequently increase the risk for fire.

The above mentioned solutions are expensive and in some cases even difficult to manufacture so as to get a predictable result. There is thus a need for a solution which provides large amount of varieties without adding significant costs and which is still easy to manufacture. A solution that provides a predictable result and which adds to the safety of the passengers.

SUMMARY

It is an object of the present disclosure to at least partly solve some of the mentioned drawbacks or at least provide for a useful alternative. One or more of the drawbacks are at least partly solved by an end part for a cross member for a vehicle seat, a cross member for a vehicle seat and a vehicle seat comprising a cross member. At least one of the objects are at least partly met by an end part for a cross member for a vehicle seat. The end part has a first portion having an impact receiving surface adapted to receive an impact and transmit it to the cross member. The cross member has a longitudinal center line. A center point of the impact receiving surface is offset with respect to the longitudinal center line so as to bend the cross member in a predetermined direction during the impact.

The end part enables a cheap and cost efficient way of modify cross members and vehicle seats by being mountable to a cross member after manufacturing of a vehicle seat or during manufacturing of a vehicle seat. The end part may further enable an integrated functionality to a cross member if manufactured as an integrated piece of material with respect to the cross member. The end part increases passenger safety as it prevents or at least significantly reduces the risk for a cross member of a vehicles seat to be deformed so that parts of the cross member injures the passenger using the vehicle seat or damages important structural features of the vehicle. The end part may thus be an impact transmitting part. The impact may be a side collision for example. The whole impact receiving surface may further be offset with respect to the longitudinal center line so as to bend the cross member in a predetermined direction during the impact. The end part may be adapted such that an impact, such as a transversal impact with respect to the vehicle seats longitudinal direction, results in a bending moment on the cross member.

The end part may comprise a second portion adapted to be connected to the cross member. The end part may be connected to the cross member in different ways, or be formed by an integrated piece of material with respect to the cross member. The end part may be detachably connected or be permanently connected. By detachably connected is hereby meant that the end part can be removed and reattached without undue burden for a worker, vehicle user or passenger. By permanently connected is hereby meant that the end part cannot be detached without damaging the end part or any elements connected thereto. The end part may be connected directly to the cross member or be operatively but indirectly connected to the cross member. There may thus optionally be one or more intermediate members between the cross member and the end part.

The end part may be connected to the cross member in different ways. Just as a matter of example, the second portion may have a cross section with a first diameter and a center point, the center point of the second portion is adapted to be aligned with the longitudinal center line of the cross member after assembly therewith. This provides an end part with good force transfer capabilities.

As an option or in addition, a portion of the end part, preferable the second portion if such is present, may be adapted to be inserted into a cavity of the cross member. Hollow cross members also referred to as cross tubes may be formed by pipes. An end part may be inserted into the opening at one end of such cross member and connected e.g. via a friction coupling or other suitable connection mechanism, welding or the like. This provides for good force transfer capabilities securing that the cross member will bend in a predictable manner.

The impact receiving surface may be adapted to redirect an impact force received along a first direction. The first direction is aligned with the longitudinal center line of the cross member so as to bend the cross member in the predetermined direction during the side collision.

The end part provides leverage to the cross member by transmitting and offsetting the imparted force from a side collision. The point of attack of the impact force is simply offset with respect to the longitudinal center line of the cross member. It has been found that the leverage may be controlled by correlating the impact receiving surface to the longitudinal center line of the cross member. Just as a matter of example, the center point of the impact receiving surface may be offset with respect to the longitudinal center line with a distance of from 2-80 mm, preferably 3-60 mm, more preferably 5-50 mm. This provides for an end part which can be used with vehicle seats of different sizes and structures while and securing a proper leverage.

The impact receiving surface of the first portion may have an area of 100 $mm^2$-800 $mm^2$. Without being bound by theory, it is believed that the impact receiving surface will benefit from having a minimum area och 100 $mm^2$. This will brace the impact force by providing a less penetrative area.

The plane may be arranged at an angle of from 90-60 degrees with respect to the longitudinal center line L1 of the cross member, preferably 90-70 degrees, more preferably 90-80 degrees, preferably the plane is substantially perpendicular to the longitudinal center line of the cross member. This will ensure a good force absorption surface on the end part.

The impact receiving surface may transcend via an angled surface towards a second portion, wherein the angled surface is angled with respect to the impact receiving surface. This provides for an increasing diameter with respect to the cross section and will continuously increase the resistance provided by the end part to deflect the impact force due to a side collision.

At least a portion of the end part may be configured to rotate a limited amount of degrees or to rotate freely. By having a rotatable portion on the end part, the end part may be adapted to cooperate with a rotatable cross member while still bend the cross member in a predetermined direction during a side collision. This is especially useful when the end part and the cross member forms parts of a seat position adjustment arrangement. A seat position adjustment arrangement generally tends to comprise an electrical motor which via the cross member may operate on one or more adjustment mechanisms such as height and/or length adjustment mechanism. The end part may thus form a part of a seat position adjustment system. The end part may be configured to rotate with respect to the vehicle seat and/or the vehicle seat, or portions thereof, may be configured to rotate with respect to the end part.

According to an aspect, the present disclosure also relates to a cross member for a vehicle seat, the cross member comprising at least one end part. The cross member provides a double functionality to a cross member. The end part increases passenger safety as it prevents or at least significantly reduces the risk for a cross member of a vehicles seat to be deformed so that parts of the cross member run the risk of injuring a passenger using the vehicle seat. The at least one end part may be a separate piece of materiel with respect to the cross member, or an integrated piece of material with respect to the cross member.

According to an aspect, the present disclosure also relates to a vehicle seat comprising at least one cross member. The present disclosure also relates to a vehicle comprising at least one vehicle seat.

The vehicle seat may comprise a first and a second slide portion along which the position of the vehicle seat is adapted to be displaced and which defines a periphery limit. The at least one end part may extend outside of the periphery limit defined by the first and second slide portions. This will ensure that the end part receives the impact force from a side collision as early as possible.

BRIEF DESCRIPTION OF THE DRAWINGS

Non-limiting embodiments of the present invention will be described in greater detail with reference to the accompanying drawings in which;

FIG. 3 shows portions of the vehicle seat from the same view of shown in FIG. 2 and partly in cross section showing the cross member and the end part according to an embodiment of the present invention;

FIGS. 4a-5b shows an embodiment of the end part from different views;

FIGS. 6a-6b shows a schematic illustration of how the end part may rotate;

DETAILED DESCRIPTION OF PREFERRED EMBODIMENTS

Figure 1:
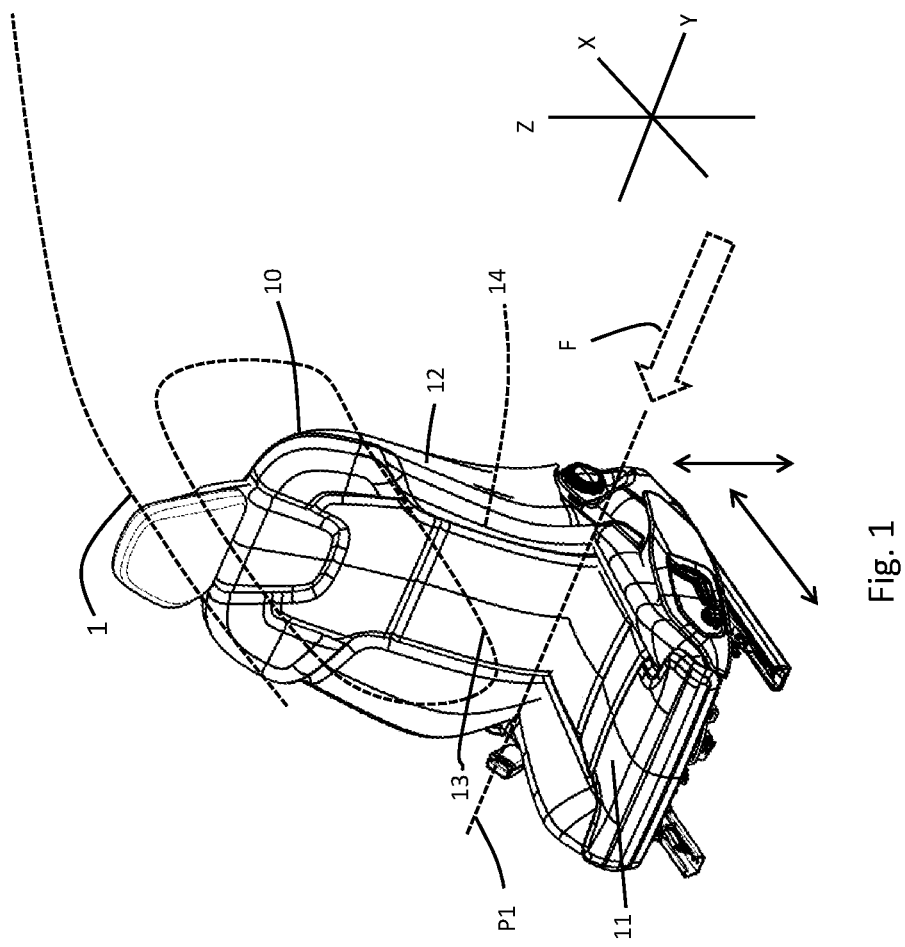
FIG. 1 schematically shows portions of a vehicle and a vehicle seat.

For the purpose of orientation the axes X, Y, Z are illustrated in FIG. 1; X axis corresponds to a longitudinal direction of the vehicle 1; Z axis corresponds to the height of the vehicle 1, and; the Y axis corresponds to the transversal direction or the width of the vehicle 1.

FIG. 1 shows a vehicle 1 comprising at least one vehicle seat 10. The vehicle seat 10 may be a front or rear vehicle seat for example. The vehicle seat 10 comprises a squab portion 11 and a back rest 12. The back rest 12 has a front side and a back side 13, 14. The vehicle seat 10 may be adjusted to provide a comfortable sit position. Just as a matter of example, the back rest 12 may be adjustable with respect to the squab portion 11 e.g. by being pivotable at a pivot axis P1. The vehicle seat 10 may further be displaceable forward and backwards i.e. along the X axis, and up and down i.e. along the Z axis. The vehicle seat 10 is illustrated in FIG. 1 with optional trims and cushions.

Figure 2:
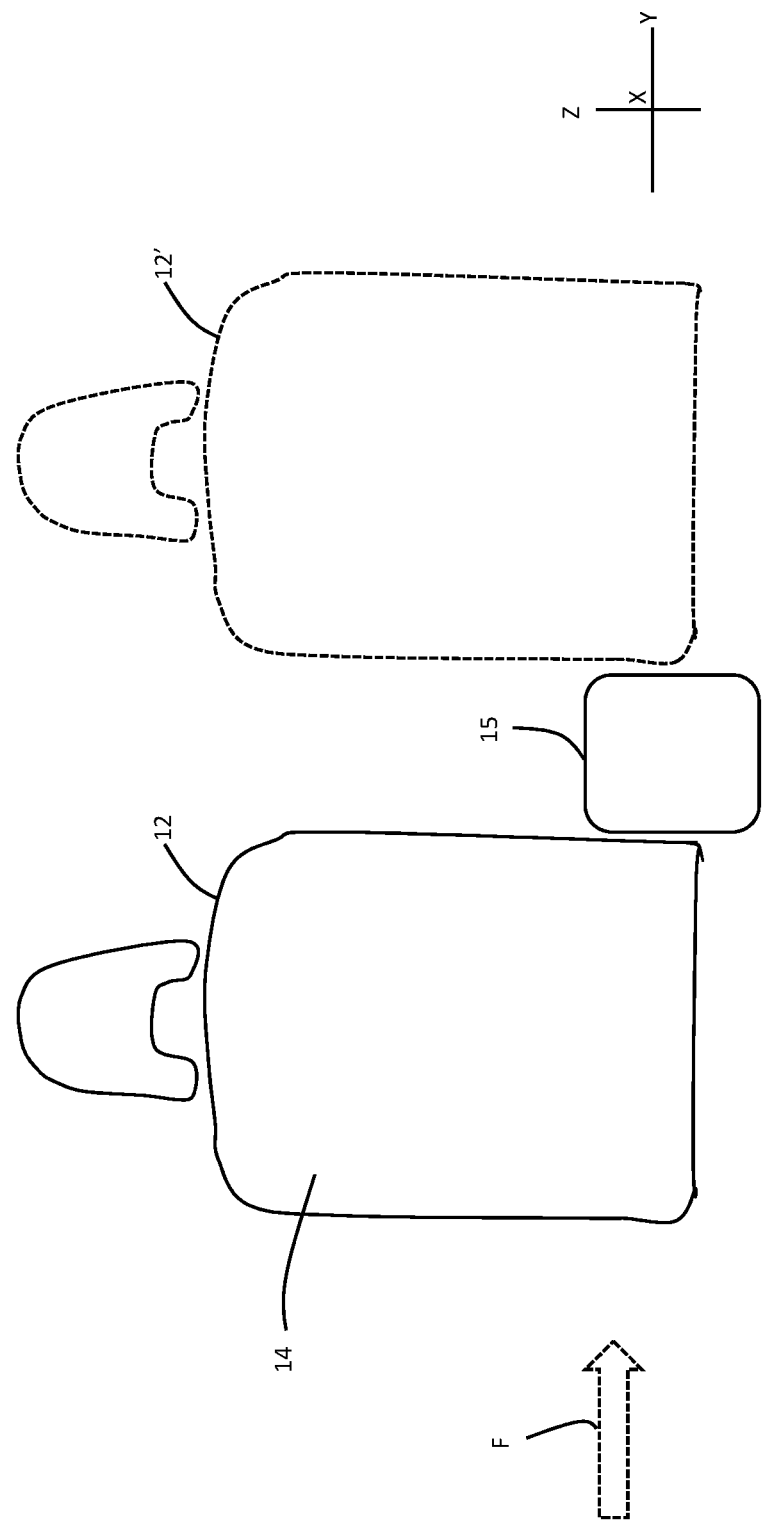
FIG. 2 schematically shows a first and a second vehicle seat with towards the back side of the back rest and separate by a tunnel area.

FIG. 2 shows a schematic view of the vehicle seat 10 with a view from behind and towards the back side 14 of the back rest 12. A second vehicle seat 12' is shown with dashed lines. A tunnel area 15 arranged between the first and the second vehicle seat 12, 12' is also shown. The present disclosure is especially advantageous for vehicles having relatively limited space between vehicle seats. As can be gleaned, electrical vehicles having batteries in the tunnel area are far more sensitive for a displacement of the vehicle seat 12 towards the tunnel area 15. Batteries positioned in the tunnel area for example may be damaged during a side collision; increasing the risk for secondary consequences incurred by damaged batteries such as an increased fire hazard.

A side collision is in the present disclosure defined as an impact having a main direction parallel with the Y axis, i.e. in a transversal direction, and indicated in FIGS. 1 and 2 with the arrow F. Such side collision may be caused by a second vehicle crashing into the side of the vehicle 1 for example. A side collision may of course come from any direction along the Y axis, i.e. from left to right, or right to left, when viewed as shown in FIG. 2. For the purpose of the present disclosure, the side collision is illustrated with the arrow F representing a force component from a vehicle impact in the side of the vehicle 1 from the left with respect to the vehicle seat 10 and when viewed as shown in FIGS. 1 and 2.

FIG. 3 shows the vehicle seat 10 in greater detail with the same view as shown in FIG. 2, i.e. from behind. Optional coverings, trims and cushions are not shown. The vehicle seat 10 comprises a cross member 20, in the shown embodiment formed by a cross tube preferably made from steel or equivalent material. The cross member 20 is a rigid member adapted to receive and withstand a predictable amount of crash violence. The cross member 20 thus serves the purpose of protecting the passenger in terms of that it provides safety by resisting deformation if a side collision occurs as illustrated by the arrow F. As mentioned above, there may be scenarios in which the cross member cannot resist deformation. In such scenario it is advantageous to control the deformation of the cross member to the largest extent possible. Another optional function of the cross member 20 may be to transfer a rotational motion from an electrical motor 18 to a seat position adjustment arrangement 19. The cross member may thus be adapted to rotate and in such case be rigid enough to permit such rotation.

Purely by way of example, in general, the cross member 20 may have a constant cross section, for instance a circular cross section, or a cross section with no predictable deformation direction.

The cross member 20 is provided with an end part 30 adapted to transmit and offset the imparted force F so as to bend the cross member 20 in a predetermined direction during a side collision. In other words, when the buckling load is imparted on the end part 30 instead of the cross member 20, the cross member will buckle in a predetermined direction. A predetermined bend direction is indicated by the arrow M in FIG. 3. As is noticeable, the bend direction M is directed away from the squab portion 11 (not shown) and any passenger(s) sitting on the squab portion 11. By forcing the cross member 20 to bend in a direction away from the squab portion 11, the vehicle seat 10 is safer in cases of a side collision for a passenger as the risk of having the cross member 20 bending towards the passenger is removed, or at least significantly reduced. By a predetermined direction is hereby meant away from the squab portion 11 of the vehicle seat 10. A safe predetermined bend direction may be slightly different than illustrated by the arrow M in FIG. 3. Just as a matter of example, a suitable bend direction may be substantially parallel with the X axis, hence, not towards the passengers sitting on the squab portion 11. The bend direction may be predetermined by the positioning of an end part, and the position of the impact receiving surface of the end part as will be disclosed below.

The vehicle seat 10 may be provided with one or more of the end parts 30 although the vehicle seat 10 shown in FIG. 3 comprises a single end part 30. The end part 30 may be integrally formed with the cross member 20 or be attached thereto as an individual piece of component with respect to the cross member 10. Just as a matter of example, the end part may be attached to the cross member in different ways e.g. welded, glued, or mechanically attached via a friction connection, a snap in connection, one or more screws or the like. The end part 30 is preferably a rigid end part manufactured from a strong material which can withstand a very high level of crash violence without deforming or breaking. In FIG. 3, the end part 30 is formed by a separate piece of material with respect to the cross member 20. The end part 30 is attached to the cross member 20 via a friction coupling operable via a screw. The cross member 20 has a longitudinal center line L1.

The end part 30 has a first portion 31 comprising an impact receiving surface 32 adapted to receive the impact during a side collision and a second portion 33 adapted to be connected to the cross member 20. The impact receiving surface 32 and its center point 32p is offset with respect to the longitudinal center line L1 of the cross member. The positioning of the offset can be used to control the direction which a cross member bends during a side collision. To better illustrate the cross member 20 and the end portion 30, the cross member 20 and the second portion 33 of the end part 30 are shown with a cross sectional view in FIG. 3.

In general terms, the second portion of the end part may be inserted into a cavity formed by the cross member. In FIG. 3, the second portion 33 has a cross section with a first diameter and a center point, the center point of said second portion is aligned with the longitudinal center line L1 of the cross member after assembly therewith. It should be noted that other attachment principles may be used but this has been found to be advantageous as it may be applied to vehicle seats without modification of the cross members. In fact, an end part 30 may even be post-manufacture mounted to the cross member 20 of an existing vehicle seat 10.

The end part may be arranged to receive an impact earlier in time than the cross member. As can be seen in FIG. 3, the vehicle seat 10 may comprise a first and a second slide portion 16, 17 along which the position of the vehicle seat 10 is adapted to be displaced and which defines a periphery limit, on the left side in FIG. 3 aligned with the intersection between the first and the second portion 31, 33 of the end part 30. The at least one end part may extend outside of the periphery limit defined by said first and second slide portions 16, 17. It is thus closer to the impact than the other vehicle seat elements. This will secure that the impact is received earlier in time by the end part 30 than remaining crash elements of the vehicle seat 10.

Figure 4B:
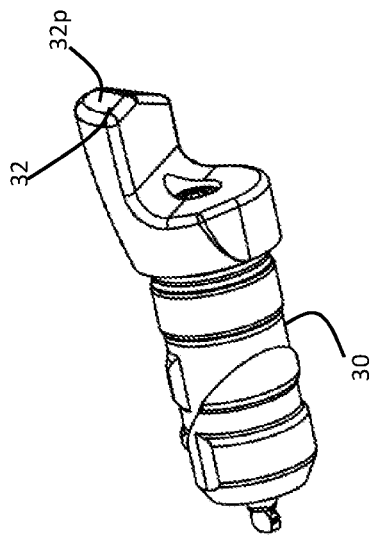
Figure 4A:
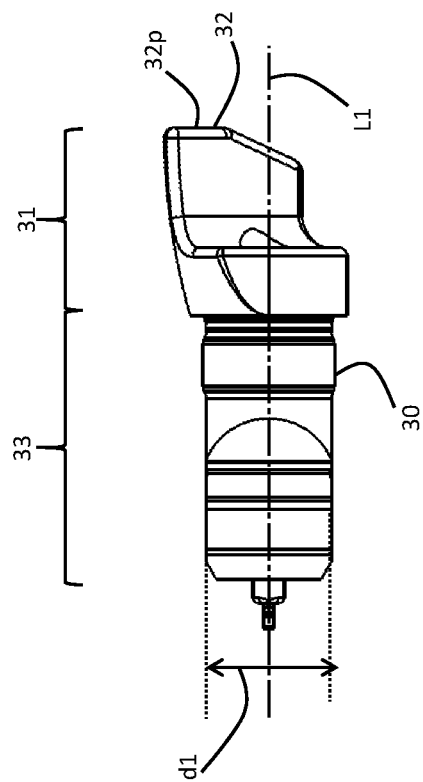

FIGS. 4a-4b shows the end part 30 in greater detail. FIG. 4a shows the end part 30 with a view from the side and aligned with the X axis, and FIG. 4b shows the end part 30 with a view in perspective. It should be noted that in FIGS. 4a-4b the end part 30 is illustrated pointing in substantially the opposite direction than in FIG. 3. According to an embodiment of the present disclosure, the end part 30 has a first portion 31 comprising an impact receiving surface 32 adapted to receive an impact during a side collision and a second portion 33 adapted to be connected to the cross member 10. The longitudinal center line L1 of the cross member 20 is illustrated. The center point 32p of the impact receiving surface 32 is offset with respect to the longitudinal center line L1 so as to bend the cross member 20 in the predetermined direction during a side collision.

In the shown embodiment, the second portion 33 of the part 30 has a diameter d1 which fits with the inner diameter of the cross member 20 and which is retained there after the friction coupling has been tightened. The end part 30 is thus rigidly connected to one end of the cross member 20 and transfers force imparted thereto directly to the cross member 20. As mentioned above, other mechanisms or arrangements may be used to connect the end part 30 to the cross member 20. As the impact receiving surface 32 is offset with respect to the longitudinal center line L1 of the cross member 20, the impact force will be diverted from entering straight into the cross member which may provoke uncontrolled deformation. This prevents the cross member from a uncontrolled buckling deformation and provides a predictable bending deformation, so that that the cross member 20 bends in a direction away from a passenger sitting in the squab portion 11 of the vehicle seat 10 as shown in FIG. 3.

FIGS. 5a-5b shows the end part from different view wherein; FIG. 5a shows the end part 30 with a view from the side and FIG. 5b shows the end part with a view along the X axis as illustrated in FIG. 3.

With reference to FIG. 5a, the impact receiving surface 32 is preferably arranged at a distance A from the cross member 20. Due to that at least a portion of the end part 30, and especially the impact receiving surface 32, extends a distance A from the cross member 20, the cross member 20 can be tuned to bend before other crash elements of the vehicle seat 10 in terms of that the end portion 30 receives the impact from the side collision earlier than other crash elements of the vehicle seat 10. Furthermore, as the direction of bend can be controlled, the end portion 30 provides additional safety to a vehicle seat 10. The impact receiving surface 32 is preferably arranged at a distance A of from 5-100 mm from the cross member 20, or the second portion 33 of the end part 30. In cases of uncertainty, the distance A should be measured when viewed as shown in FIG. 5a.

The impact receiving surface 32 is arranged on a distal end 35d of a protruding portion 35 extending from a base portion 36 of the first portion 31 of the end part 30. The base portion 36 could in principle be formed by a portion of the cross member 20. In the shown embodiment, the base portion 36 and distal portion 35 are formed by a single body of solid steel. The protruding portion 35 extends from the base portion 36 and has a proximal end 35p and a distal end 35d. The distal end 35d of the protruding portion 35 forms the impact receiving surface 32 which transcends via a an angled surface 37 into the protruding portion 35. The base portion 36 thus has a surface which intersects with the longitudinal center axis L1 of the cross member 20 during use, i.e. either after being mounted thereto, or if being an integral part thereof. For the purpose of clarity, the longitudinal center line L1 has been indicated in FIGS. 5a and 5b as if the end part 30 was arranged on the cross member 20.

As mentioned above, the cross member 20 may be adapted to be rotated e.g. for the purpose of the adjusting the position of the vehicle seat 10. A rotatable cross member 20 may thus be used to adjust the height of the vehicle seat 10.

The end part 30 and the cross member 20 may form parts of a seat position adjustment arrangement (shown in FIG. 3). The end part may however be fully operable without such seat position adjustment arrangement. The end part 30 may be adapted to be rotated e.g. about the longitudinal center line L1 of the cross member 20 for example. However it is still preferred that the center point 32p of the impact receiving surface 32 of the first portion 31 of the end part 30 is still in position to offset, or redirect, an impact force from a side collision so that the cross member 20 bends in a predetermined direction and thus away from the squab portion of the vehicle seat. The angled surface 37 transcending from the impact receiving surface 32 to the protruding portion 35 may compensate for the rotation of the end part 30 and thus enable the center point 32p of the impact receiving surface 32 still being offset with respect to the longitudinal center line L1. Ac can be seen in FIG. 5a, the second portion 33 has a cross section with a diameter d2 and a center point d2cp. The center point of the second portion 33 is adapted to be aligned with the longitudinal center line L1 of the cross member 20. It should be noted however that it does not have to be aligned in order to the end part to work.

FIG. 5b shows a schematic view of the end part 30 along the Y axis and towards the impact receiving surface 32. The angled surface 37 can be seen transcending into the periphery of the protruding portion 35. The base portion 36 of the end part is further shown. Indicated with dashed lines is an outer periphery 20op of the cross section of the cross member 20. As can be gleaned from the embodiment shown in FIG. 5b, the impact receiving surface 32 extends outside the outer periphery 20op of the cross section of the cross member 20. Hence in more general terms, the end part may comprise an impact receiving surface extending outside of the outer periphery of the cross section of the cross member, or even be provided fully outside of the outer periphery of the cross section of the cross member. In cases of uncertainty when determining the outer periphery as disclosed above, the end part is viewed as shown in FIG. 5b, i.e. along the longitudinal axis L1 of the cross member and along the Y axis. In a preferred embodiment, at least 50%, preferably at least 60%, more preferably at least 70% of the impact receiving surface 32 is extending outside of the outer periphery of the cross section of the cross member.

From FIG. 5b it may be gleaned that the impact receiving surface 32 of the end part 30 is arranged in one half of the circle like periphery formed by the end part 30 when viewed as shown in FIG. 5b. For the purpose of orientation, a plane P2 extending through the corresponding point of the longitudinal center line L1 may be used to define two opposing halves of a circle like periphery defined by the end part 30. As can be noticed, the impact receiving surface 32 is positioned fully in one half of the two halves of the circle like form defined by the periphery of the end part 30. In one embodiment, the impact receiving surface 32 is arranged only in a quadrant of the two halves of the circle like form defined by the periphery of the end part 30. As mentioned, the impact receiving surface may be positioned in one half of the two halves formed by the plane P2 and defined by the periphery of the end part 30. The predetermined bend direction will thus be in the direction of the opposing half.

FIGS. 6a-6b shows the same end part 30 with the same view as shown in FIG. 5b. As mentioned above, the end part 30 may be adapted to be rotated. FIGS. 6a-6g illustrate such rotation visualized by the rotation angle α. The impact receiving surface 32 may be configured to permit the rotation angle α of from 0-90 degrees. In FIGS. 6a-6b the rotation angle α is approximately 30 degrees. The end part 30 should be adapted so that it can be rotated at least a rotation angle α of from 0-90 degrees, 1-90 degrees, 5-90 degrees, 5-80 degrees, 5-70 degrees, preferably 5-60 degrees, while still permitting the cross member to bend in a predetermined preferred direction during a side collision. In general terms, at least a portion of the end part may be configured to rotate a limited amount of degrees or to rotate freely i.e. an unlimited amount of degrees, while still permitting the cross member to bend in a predetermined preferred direction during a side collision.

FIGS. 6a-6b also show that the impact receiving surface 32 of the first portion 31 has a center point 32p, the centre point 32p is offset with respect to the longitudinal center line L1 with a distance Dcp of from 2-80 mm, preferably 3-60 mm, more preferably 5-50 mm. The distance of the offset, i.e. the distance between the first center point 32p of the impact receiving surface 32 and the longitudinal center line L1 provides leverage and thus assist in diverting the impact force from a side collision and bend the cross member 20. The position of the center point 32p on the impact receiving surface 32 may be determined by view the end part as seen in FIG. 6a. In cases of uncertainty, the position of the center point 32p on the impact receiving surface 32 may be determined by calculation using computer software such as CAD or similar. A computer model of the impact receiving surface 32, or of the whole end part, or first portion of the end part, may be created using suitable computer software and without undue burden. From such model, the center point 32p may be determined.

With reference again to FIGS. 5a-5b, the area of the impact receiving surface 32 is preferably 100 mm$^2$-800 mm$^2$. The area of the impact receiving surface 32 may be defined as an area adapted to receive an impact from a side collision substantially simultaneously or simultaneously. In comparison, a spear head has a pointy tip with an increasing edge, the impact receiving surface may be a substantially flat surface with respect to the longitudinal center line L1 of the cross member. In general terms, the area of impact receiving surface 32 may be a flat surface, a curved surface such as a hemi-sphere like surface, polygonal shaped surface, or combinations thereof. Just as a matter of example, the impact receiving surface 32 may form a plane P3. The plane P3 formed by the impact receiving surface 32 may be substantially perpendicular to the longitudinal center line L1 of the cross member 20. This is illustrated in FIGS. 5a-5b by the reference P3. In general; the plane P3 may be arranged at an angle of from 90-60 degrees with respect to the longitudinal center line L1 of the cross member 20, preferably 90-70 degrees, more preferably 90-80 degrees. This will secure that the force from a side collision is received by the end part, and thus that it may be absorbed by the bending of the cross member.

Figures 7A, 7B:
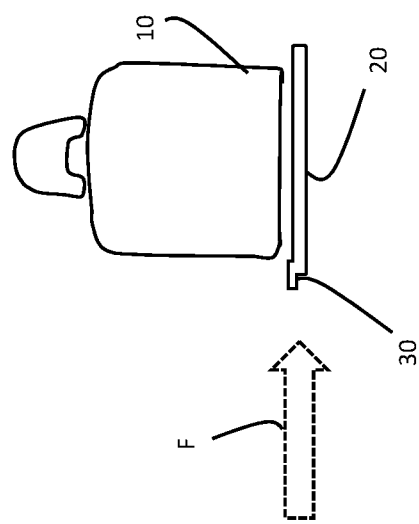
FIG. 7a shows a schematic view of portions of a vehicle seat and, a cross member and an end part before a side collision.
FIG. 7b shows a schematic view of portions of the vehicle seat of FIG. 7a, the cross member and the end part after a side collision.

FIG. 7a shows a schematic view of the vehicle seat 10 before a side collision and FIG. 7b shows a schematic view the vehicle seat 10 after a side collision. As can be seen from FIG. 6b, the end part 30 will redirect the impact force illustrated by the arrow F in this case due to a side collision, so that the cross member bends in a direction away from the squab portion 11 of the vehicle seat 10 and a passenger sitting in the vehicle seat, towards the vehicle floor (not shown).

With reference to FIG. 3 again, the end part 30 may be fixed to a portion of the vehicle seat 10, while being rotatable with respect to the cross member 20. The second portion 33 may for example simply slide inside the cross member 30. This will keep the end part and especially the center point 32p of the impact receiving surface at an appropriate position.

The end part, and a cross member comprising one or more such end parts, and a vehicle seat disclosed herein provides for an improved safety a passenger as it will prevent the cross member from bending in the wrong direction. It may also offset the imparted force at an early stage during a collision thus bending the cross member before, or at least in an early stage, other element of the vehicle seat is affected. As the end part may be arranged to a portion of the chassi of the vehicle it offers flexibility at low cost.

What is claimed is:

1. An end part for a cross member for a vehicle seat, comprising:
   a first portion having an impact receiving surface adapted to receive an impact and transmit it to said cross member,
   wherein said impact receiving surface transcends via an angled surface towards a second portion, wherein said angled surface is angled with respect to said impact receiving surface,
   said cross member having a longitudinal center line,
   wherein a center point of said impact receiving surface is offset with respect to said longitudinal center line so as to bend said cross member in a predetermined direction during said impact.

2. The end part according to claim 1, wherein said end part comprises a second portion adapted to be connected to said cross member.

3. The end part according to claim 2, wherein said second portion has a cross section with a diameter and a center point, said center point of said second portion is adapted to be aligned with said longitudinal center line of said cross member after assembly therewith.

4. The end part according to claim 1, wherein a portion of said end part is adapted to be inserted into a cavity of said cross member.

5. The end part of claim 1, wherein said impact receiving surface is adapted to redirect an impact force received along a first direction, said first direction being aligned with said longitudinal center line of said cross member so as to bend said cross member in said predetermined direction during said impact.

6. The end part according to claim 1, wherein said center point is offset with respect to said longitudinal center line with a distance of from 2-80 mm, preferably 3-60 mm, more preferably 5-50 mm.

7. The end part according to claim 1, wherein said impact receiving surface of said first portion has an area of between 100 mm$^2$ and 800 mm$^2$.

8. The end part according to claim 1, wherein said impact receiving surface forms a plane, wherein said plane is arranged at an angle of from 90-60 degrees with respect to the longitudinal center line (L1) of the cross member.

9. The end part according to claim 1, wherein at least a portion of said end part is configured to rotate a limited amount of degrees, or to rotate freely.

10. The end part according to claim 1, wherein said end part forms a part of a seat position adjustment system.

11. A cross member for a vehicle seat, comprising at least one end part according claim 1.

12. The cross member according to claim 11, wherein said at least one end part is a separate piece of material with respect to said cross member, or an integrated piece of material with respect to said cross member.

13. A vehicle seat comprising at least one cross member and at least one end part, wherein the at least one end part comprises:
- a first portion having an impact receiving surface adapted to receive an impact and transmit it to said cross member,
- said cross member having a longitudinal center line,
- wherein a center point of said impact receiving surface is offset with respect to said longitudinal center line so as to bend said cross member in a predetermined direction during said impact,
- wherein said vehicle seat comprises a first and a second slide portion along which the position of said vehicle seat is adapted to be displaced and which defines a periphery limit,
- wherein said at least one end part extends outside of said periphery limit defined by said first and second slide portions.

14. An end part for a cross member for a vehicle seat, comprising:
- a first portion having an impact receiving surface adapted to receive an impact and transmit it to said cross member, and
- a second portion adapted to be connected to said cross member,
- said cross member having a longitudinal center line,
- wherein said second portion has a cross section with a diameter and a center point, said center point of said second portion being adapted to be aligned with said longitudinal center line of said cross member after assembly therewith,
- wherein a center point of said impact receiving surface is offset with respect to said center point of said second portion so as to bend said cross member in a predetermined direction during said impact.

* * * * *